(12) United States Patent
Hirose et al.

(10) Patent No.: US 6,508,858 B2
(45) Date of Patent: *Jan. 21, 2003

(54) METHOD AND APPARATUS FOR TREATING EXHAUST GASES

(75) Inventors: Hideki Hirose, deceased, late of Kakamigahara (JP), by Fumiko Hirose, legal representative; Mikio Hachikawa, Kasugai (JP); Kouji Teramoto, Kasugai (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/557,614

(22) Filed: Apr. 25, 2000

(65) Prior Publication Data
US 2002/0148352 A1 Oct. 17, 2002

(30) Foreign Application Priority Data
Oct. 19, 1999 (JP) .......................................... 11-296096

(51) Int. Cl.$^7$ .............................................. B01D 53/06
(52) U.S. Cl. ................... 95/1; 95/8; 95/11; 95/90; 95/107; 95/114; 95/115; 95/141; 95/148
(58) Field of Search ................ 95/1, 8, 11, 90, 95/107, 108, 114, 115, 121, 125, 126, 141, 148, 900, 901, 903; 96/108, 109, 111, 122, 123, 126, 127, 139, 141, 143, 146, 150, 151; 73/30.01

(56) References Cited

U.S. PATENT DOCUMENTS

| | | | | |
|---|---|---|---|---|
| 1,836,301 A | * | 12/1931 | Bechthold | 95/115 |
| 2,449,622 A | * | 9/1948 | Roetheli | 422/144 |
| 2,946,402 A | * | 7/1960 | Becker-Boost et al. | 95/114 |
| 3,446,060 A | * | 5/1969 | Venezky et al. | 95/141 |
| 4,061,477 A | * | 12/1977 | Murakami et al. | 96/150 |
| 4,203,735 A | * | 5/1980 | Colombo et al. | 95/141 |
| 4,856,320 A | * | 8/1989 | Bose et al. | 73/30.01 |
| 4,874,524 A | * | 10/1989 | Liapis et al. | 95/122 |
| 5,069,038 A | * | 12/1991 | Peinze | 62/636 |
| 5,187,131 A | * | 2/1993 | Tiggelbeck et al. | 95/104 |
| 5,505,825 A | * | 4/1996 | Gold et al. | 95/126 |
| 5,730,781 A | * | 3/1998 | Martin et al. | 95/108 |
| 6,110,258 A | * | 8/2000 | Fraenkel et al. | 95/902 |

* cited by examiner

Primary Examiner—Duane Smith
Assistant Examiner—Jason M. Greene
(74) Attorney, Agent, or Firm—Armstrong, Westerman & Hattori, LLP

(57) ABSTRACT

An apparatus for treating exhaust gases. The apparatus includes an adsorbing tower containing an adsorbent to adsorb an impurity gas included in the exhaust gases. A desorbing tower heats the adsorbent to desorb the impurity gas from the adsorbent so that the adsorbent can be re-used. A transfer unit circulates the adsorbent between the adsorbing tower and the desorbing tower. A controller controls the temperature of the adsorbent. A helical heater is arranged in the desorbing tower to heat the adsorbent.

5 Claims, 5 Drawing Sheets

METHOD AND APPARATUS FOR TREATING EXHAUST GASES

BACKGROUND OF THE INVENTION

The present invention relates to a method and apparatus for treating exhaust gases, and more particularly, to an exhaust gas treating method and apparatus that uses an adsorbent to separate organic gases from exhaust gases produced in factories.

Organic solvents are used to fabricate semiconductor devices. This results in the production of gases, including organic gases, in semiconductor fabrication plants. Accordingly, exhaust gas treating apparatuses are installed in the fabrication plants to separate the organic gases. A typical exhaust gas treating apparatus contains an adsorbent to adsorb the organic gases. The adsorbent is renewed periodically in a desorbing tower of the exhaust gas treating apparatus and recycled.

With reference to FIG. 1A, a prior art exhaust gas treating apparatus is provided with a cylindrical desorbing tower 1 to renew the adsorbent (activated carbon). The activated carbon adsorbs organic gases in an adsorbing tower (not shown) and is then sent to an upper portion of the desorbing tower 1. Afterward, the activated carbon is heated to a predetermined temperature at a heating portion 2. This desorbs the organic gases adsorbed by the adsorbent and renews the activated carbon. The renewal permits the activated carbon to be repeatedly recycled.

Referring to FIG. 1B, the heating portion 2 includes a brass electric heater 4 and a plurality of upper and lower radially extending fins 5. The heater 4 is arranged along the inner wall of the desorbing tower 1 to heat the interior of the desorbing tower 1 with the fins 5. The upper and lower fins 5 are arranged alternately. Thus, the activated carbon passes through the heating portion 2 slowly. The fins 5 contact and heat the passing activated carbon.

In recent years, organic gases having relatively high boiling points (e.g., N-methyl-2-pyrrolidone (NMP), boiling point 202° C.) have been used to fabricate semiconductor devices. Hence, the activated carbon is heated to a temperature higher than 200° C. in accordance with the boiling points of the organic gases adsorbed.

Since the activated carbon is heated by the heater 4 with the fins 5 in the conventional desorbing tower 1, it is difficult to heat the activated carbon to 200° C. or higher.

If the temperature of the heated activated carbon is lower than the boiling point, the adsorbing capacity of the renewed activated carbon is insufficient. This decreases the treating efficiency (organic gas separating efficiency) of the exhaust gas treating apparatus. For example, if the activated carbon is heated to a temperature lower than the boiling point, the specific surface area, which indicates the adsorbing capacity of the activated carbon, may decrease to about 40% of fresh activated carbon. Therefore, the activated carbon must frequently be exchanged in the conventional exhaust gas treating apparatus to maintain the necessary treating efficiency. This increases the operating cost of the exhaust gas treating apparatus.

Further, the heater 4 is located near the outer wall of the desorbing tower 1. This results in a large difference between the temperature at the portions of the fins 5 closer to the outer wall and that at the portions of the fins 5 closer to the center of the desorbing tower 1. Thus, the heating temperature is non-uniform. This makes it difficult to accurately control the temperature of the activated carbon.

In addition, the heater 4 enlarges the desorbing tower 1. The desorbing tower 1 is covered by a heat insulating material, such as glass wool. The heat insulating material is further covered by a sheet of, for example, stainless steel. These covers further enlarge the desorbing tower 1. Thus, the desorbing tower 1 occupies a large amount of space and is expensive.

SUMMARY OF THE INVENTION

It is an object of the present invention to provide an exhaust gas treating apparatus that is relatively compact and is highly efficient.

To achieve the above object, the present invention provides a method for treating exhaust gases including the steps of adsorbing impurity gases included in the exhaust gases with an adsorbent, desorbing the impurity gases from the adsorbent in a desorbing tower by heating the adsorbent selectively to a first predetermined temperature and a second predetermined temperature, which is higher than the first predetermined temperature, and recycling the desorbed adsorbent.

Another aspect of the present invention provides an apparatus for treating exhaust gases. The apparatus includes an adsorbing tower containing an adsorbent to adsorb an impurity gas included in the exhaust gases, a desorbing tower for heating the adsorbent to desorb the impurity gas from the adsorbent and renew the adsorbent, a transfer unit for circulating the adsorbent between the adsorbing tower and the desorbing tower, and a controller for controlling the temperature of the adsorbent.

A further aspect of the present invention provides an apparatus for treating exhaust gases including a desorbing tower for heating an adsorbent to desorb impurity gases adsorbed to the adsorbent and renew the adsorbent. The adsorbent falls through the desorbing tower. A helical heater is arranged in the desorbing tower to heat the falling adsorbent.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 8A and 8B are schematic views showing another example of a heater according to the present invention; and FIGS. 9A and 9B are schematic views showing a further example of a heater according to the present invention.

BRIEF DESCRIPTION OF THE DRAWINGS

An exhaust gas treating apparatus 21 according to a first embodiment of the present invention will now be described.

Figure 1A:
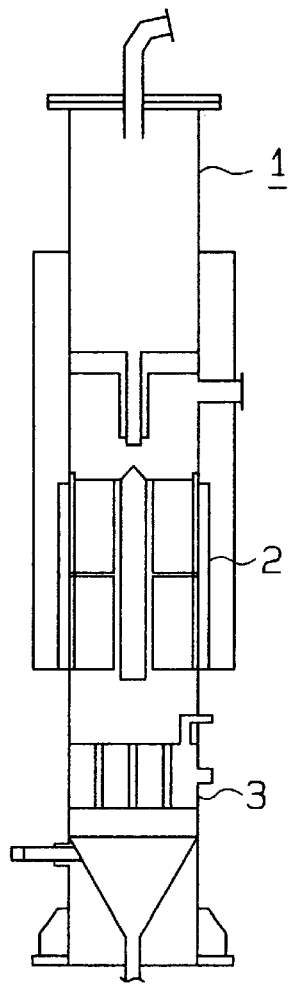
FIG. 1A is a schematic cross-sectional view showing a prior art desorbing tower.
Figure 1B:
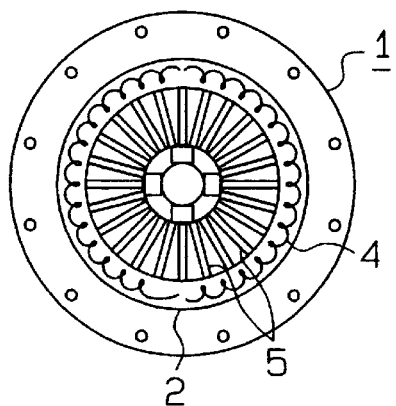
FIG. 1B is an enlarged cross-sectional view showing a heating portion of the desorbing tower of FIG. 1A.
Figure 2:
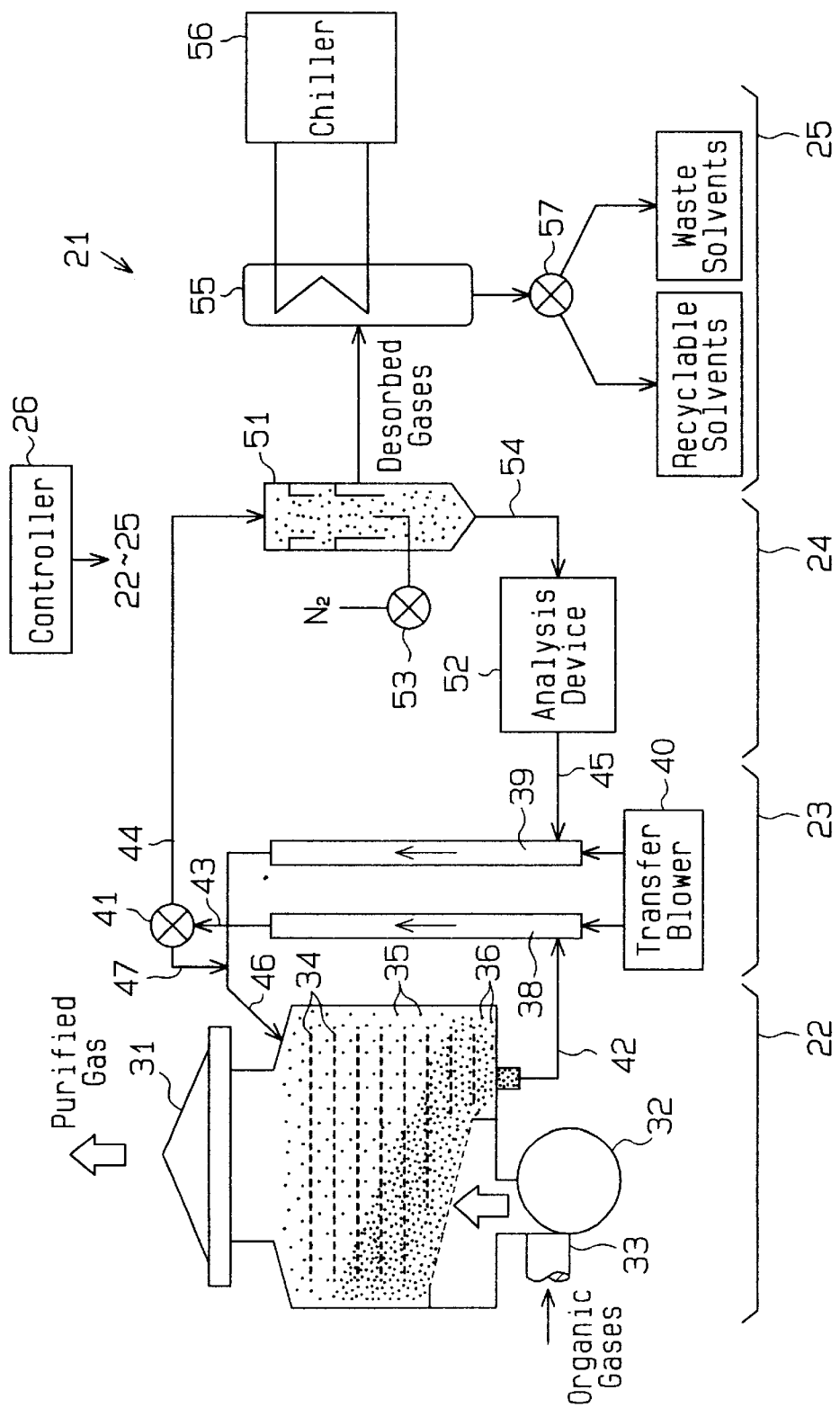
FIG. 2 is a schematic diagram showing an exhaust gas treating apparatus according to a first embodiment of the present invention.

With reference to FIG. 2, the exhaust gas treating apparatus 21 includes an adsorbing unit 22, a transfer unit 23, a desorbing unit 24, a collecting unit 25, and a controller 26. The adsorbing unit 22 purifies the exhaust gases produced by a semiconductor fabrication apparatus (not shown) by using activated carbon, which functions as an adsorbent, to adsorb organic gases (impurity gases) included in the exhaust gases. The transfer unit 23 transfers the activated carbon between the adsorbing unit 22 and the desorbing unit 24. The desorbing unit 24 desorbs the organic gases adsorbed in the activated carbon to renew the activated carbon. The collecting unit 25 cools the organic gases desorbed by the desorbing unit 24 to collect recyclable solvents or waste liquids. The controller 26 controls each of the units 22–25.

The adsorbing unit 22 includes an adsorbing tower 31 and an exhaust gas intake blower 32. The bottom of the adsorbing tower 31 is connected to a semiconductor fabrication apparatus by a transfer pipe 33. The exhaust gas intake blower 32, which is arranged in the transfer pipe 33, provides the adsorbing tower 31 with the exhaust gas from the semiconductor fabrication apparatus. The adsorbing tower 31 contains a plurality of superimposed filters 34. The transfer unit 23 constantly supplies renewed activated carbon (hereafter referred to as desorbed carbon) 35 to the uppermost filter 34. The desorbed carbon 35 is moved along each of the filters 34 in a predetermined direction and falls from the edges of the filters 34 onto the next filter 34.

The exhaust gas contacts the activated carbon as it rises through the adsorbing tower 31. As the exhaust gas rises, the organic gases in the exhaust gas are adsorbed by the activated carbon. The purified gas is discharged from the upper end of the adsorbing tower 31. The activated carbon in which organic gases are adsorbed (hereafter referred to as adsorbing carbon) is sent to the transfer unit 23 through a first conveying pipe 42.

The transfer unit 23 includes first and second transfer passages 38, 39, a transfer blower 40, and a bypass valve 41. The first conveying pipe 42 is connected to the lower end of the first transfer passage 38, the upper end of which is further connected to a second conveying pipe 43. The transfer blower 40 supplies the first transfer passage 38 with compressed air to transfer the adsorbing carbon 36 upward through the first transfer passage 38. The bypass valve 41 is connected to the second conveying pipe 43, a third conveying pipe 44, and a bypass line 47. The adsorbing carbon 36 is transferred to the desorbing unit 24 though the bypass valve 41 and the third conveying pipe 44.

A fourth conveying pipe 45 is connected to the lower end of the second transfer passage 39. The desorbed carbon 35 is provided to the second transfer passage 39 from the desorbing unit 24 through the fourth conveying pipe 45. The transfer blower 40 supplies the second transfer passage 39 with compressed air to transfer the desorbed carbon 35 upward through the second transfer passage 39. The desorbed carbon 35 is transferred to the adsorbing unit 22 (the upper portion of the adsorbing tower 31) through a fifth conveying pipe 46 connected to the upper end of the second transfer passage 39.

The transfer unit 23 transfers the adsorbing carbon 36 from the adsorbing unit 22 to the desorbing unit 24 and the desorbed carbon 35 from the desorbing unit 24 to the adsorbing unit 22. Thus, the activated carbon is circulated between the adsorbing unit 22 and the desorbing unit 24. This enables the exhaust gas treating apparatus 21 to purify the exhaust gases and renew the adsorbing carbon 36 continuously.

The bypass line 47 connects the bypass valve 41 with a fifth conveying pipe 46. The bypass valve 41 is controlled by the controller 26. The bypass valve 41 selectively switches the destination of the adsorbing carbon 36 between the desorbing unit 24 and the adsorbing unit 22.

Figure 3:
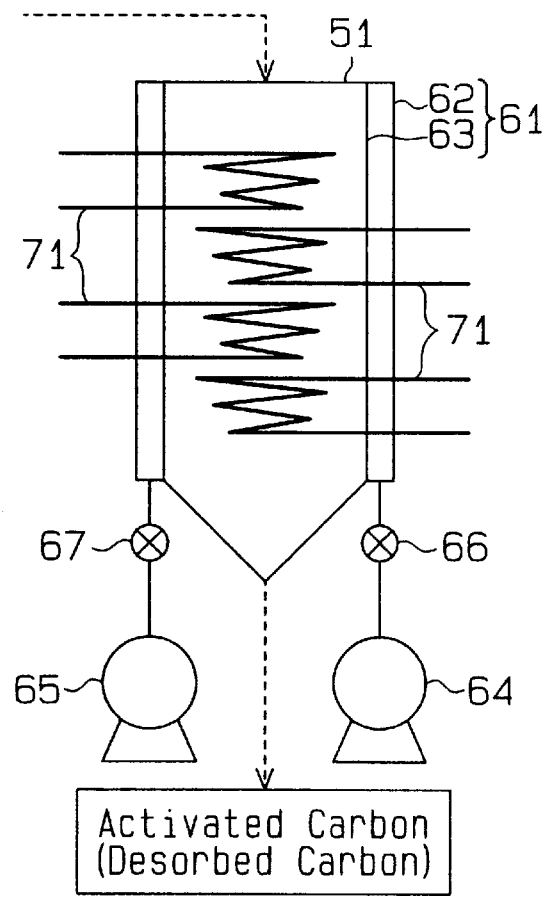
FIG. 3 is a schematic diagram showing an adsorbing tower of the apparatus of FIG. 2.
Figure 4:
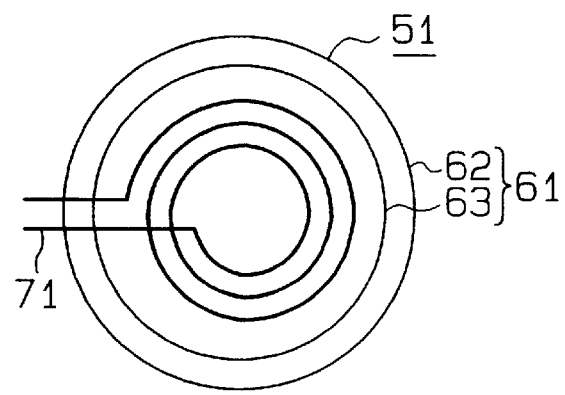
FIG. 4 is a plan view of a heater of the apparatus of FIG. 3.
Figure 5:
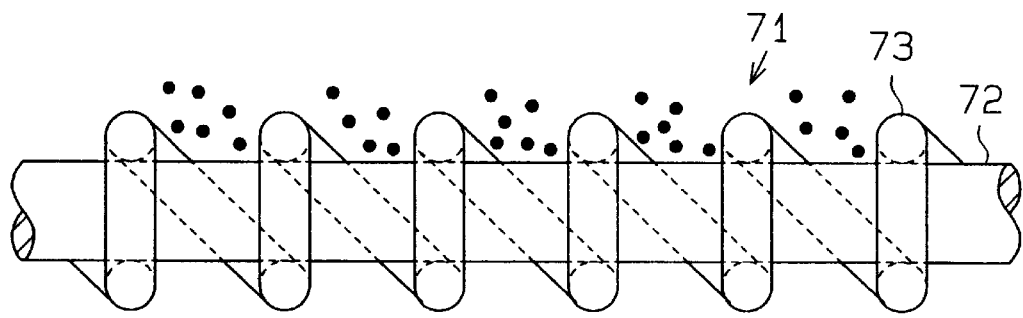
FIG. 5 is an enlarged side view showing the heater of FIG. 4.

The desorbing unit 24 includes a desorbing tower 51 and a weight analysis device 52. The desorbing tower 51 is cylindrical and accommodates heaters 71, which are shown in FIGS. 3 to 5. The heaters 71 are controlled by the controller 26.

The adsorbing carbon 36 comes into contact with the heaters 71 in the desorbing tower 51 and is heated to a predetermined first desorbing temperature (normal processing mode). The first desorbing temperature is chosen to enable the desorption of organic gases having relatively low boiling points, such as toluene, and is preferably 120° C. to 160° C. Organic gases having low boiling points are desorbed from the adsorbing carbon 36 when heated to the first desorbing temperature. This treatment produces desorbed carbon 35. The treated desorbed carbon 35 is sent to the weight analysis device 52 through a sixth conveying pipe 54.

The weight analysis device 52 measures the density of the adsorbing carbon 35 and sends the measured value to the controller 26. More specifically, the weight analysis device 52 extracts part of the desorbed carbon 35 to measure the bulk density. All of the desorbed carbon 35 provided by the desorbing tower 51 does not have to be measured since the desorbed carbon 35 has a substantially uniform bulk density.

The controller 26 calculates the adsorbed amount of the organic gases residing in the desorbed carbon 35 based on the result of the weight analysis to estimate the adsorbing capacity of the desorbed carbon 35 from the adsorbed amount of the organic gases. The controller 26 then compares the adsorbing capacity of the desorbed carbon 35 with the adsorbing capacity of unused carbon (fresh carbon), or an initial value.

If the adsorbing capacity of the desorbed carbon 35 is extremely low, that is, if the residual adsorbed amount of the desorbed carbon 35 is greater than a predetermined value, the controller 26 switches the heaters 71 to a high temperature processing mode from the normal processing mode. When in the high temperature processing mode, the heaters 71 heat the adsorbing carbon 36 to a second adsorbing temperature, which is higher than the first adsorbing temperature.

More specifically, the bulk density of fresh carbon is 0.6 to 0.62 g/ml, and the bulk density of treated activated carbon is 0.62 to 0.65 g/ml. To maintain the capacity of the treated carbon at 85 to 90% of fresh carbon, the controller 26 switches the heaters 71 to the high temperature processing mode when the bulk density of the renewed carbon increases to 0.65 to 0.68 g/ml (preferably 0.65 g/ml).

The second desorbing temperature is chosen to enable the desorption of organic gases having relatively high boiling points, such as NMP, and is preferably set at 400° C. When heated to the second desorbing temperature, substantially all of the organic gases adsorbed in the adsorbing carbon (including organic gases having boiling points ranging from a low temperature to a high temperature) are desorbed. This renews the adsorbing carbon 36, including that having an extremely low adsorbing capacity, and delivers desorbed carbon 35 having an adsorbing capacity that is substantially the same as fresh carbon.

The controller 26 heats the adsorbing carbon 36 to the first desorbing temperature to desorb and collect organic gases having boiling points that are close to the first desorbing temperature. If the adsorbing capacity of the desorbed carbon 35 becomes lower than a predetermined value, the controller 26 controls the heaters 71 to heat the adsorbing carbon 36 to the second desorbing temperature. This desorbs organic gases having boiling points that are equal to or lower than the second desorbing temperature and thus increases the adsorbing capacity of the desorbed carbon 35.

Nitrogen gas is provided from a nitrogen gas valve 53 to quickly lower the temperature in the desorbing tower 51 to the first desorbing temperature. The desorbing tower 51 has a structure having a high heat insulating capability to stabilize the temperature in the desorbing tower 51. Thus, a long period of time would be necessary to cool the interior of the desorbing tower 51 to the first desorbing temperature just by turning off the heaters 71. That is, it would take much time to switch from the high temperature processing mode to the normal processing mode by simply stopping the energy source. Accordingly, by supplying the desorbing tower 51 with nitrogen gas, the switching time is shortened and the standby time of the desorbing unit 24 is decreased.

The collecting unit 25 includes a condenser 55, a chiller unit 56, and a switch valve 57. A coolant is circulated between the chiller unit 56 and the condenser 55. The desorbed organic gases (desorbed gases) are sent to the condenser 55 from the desorbing tower 51. The condenser 55 cools and liquefies the organic gases. The liquid is then sent to a tank for collecting recyclable solvents or a tank for collecting waste (waste liquid) from the condenser 55 in accordance with the position of the switch valve 57.

More specifically, the controller 26 switches the valve 57 so that the liquid from the condenser 55 is collected as recyclable solvents during the normal processing mode. The recyclable solvents include organic solvents that are desorbed at the first desorbing temperature and have boiling points close to the first desorbing temperature, such as toluene.

The controller 26 also switches the valve 57 so that the liquid from the condenser 55 is collected as waste solvents (waste liquid) during the high temperature processing mode. The waste liquid is a mixture of organic solvents that are desorbed at the second desorbing temperature and have boiling points ranging from ordinary temperatures to the vicinity of the second desorbing temperature, such as NMP.

The collection of the recyclable solvents decreases the consumption of the solvents and reduces the cost of running the semiconductor fabrication apparatus. Further, by collecting recyclable solvents during the normal processing mode, the amount of liquid waste collected during the high temperature processing mode decreases.

Figure 6:
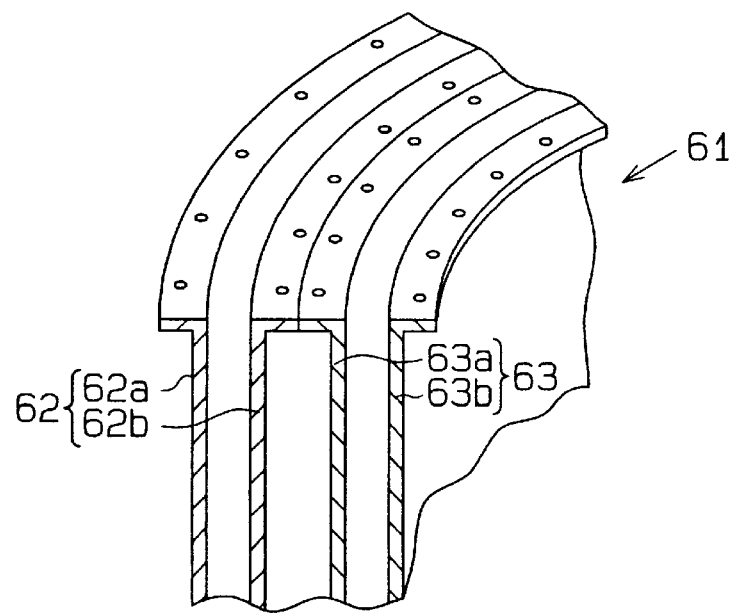
FIG. 6 is an enlarged cross-sectional view showing part of a case of the desorbing tower of FIG. 3.

The desorbing tower 51 will now be discussed in detail. Referring to FIGS. 3 and 6, the desorbing tower 51 includes a case 61 having a two-part structure formed by an outer wall 62 and an inner wall 63. A clearance exists between the outer wall 62 and the inner wall 63. The clearance is depressurized by two vacuum pumps 64, 65, which are connected to the case 61. Accordingly, the case 61 is insulated. That is, the case 61 impedes the conduction of heat between the interior and exterior of the desorbing tower 51. Thus, the temperature in the desorbing tower 51 is hardly affected by the ambient temperature.

Referring to FIG. 6, the outer wall 62 may further have a two-part structure formed by a first plate 62a and a second plate 62b. The inner wall 63 may also have a two-part structure formed by a first plate 63a and a second plate 63b. In such case, the clearance between the first and second plates 62a, 62b of the outer wall 62 and the clearance between the first and second plates 63a, 63b of the inner wall 63 may be depressurized to improve the insulation of the case 61.

Vacuum valves 66, 67 are arranged in pipes connecting the case 61 to the vacuum pumps 64, 65, respectively. The vacuum valves 66, 67 are controlled by the controller 26 shown in FIG. 2. When the pressure of the clearance between the outer and inner walls 62, 63 rises, the controller 26 drives the vacuum pumps 64, 65, opens the vacuum valves 66, 67, and maintains the pressure of the clearance within a predetermined range. The vacuum pumps 64, 65 are driven in an intermittent manner by the controller 26. This reduces costs related with the operation of the vacuum pumps 64, 65.

The heaters 71 are arranged one upon another in the desorbing tower 51. Referring to FIG. 4, the heaters 71 are each spiral (or helical) and conical so that the diameter decreases gradually in the transfer direction of the adsorbing carbon 36. The heaters 71 are shaped and arranged so that they contact the adsorbing carbon 36 a multiple number of times and heat the adsorbing carbon 36 in the desorbing tower 51.

As shown in FIG. 5, each heater 71 has a main coil 72, which serves as a first heating body, and an extension 73, or an auxiliary coil, that serves as a second heating body. The extension 73 is formed helically about the main coil 72. The extension 73 is heated by the main coil 72 and increases the surface area of the heater 71. Thus, the adsorbing carbon 36 contacts the heater 71 more frequently. This ensures that the adsorbing carbon 36 is heated to the desired temperature.

Figure 7:
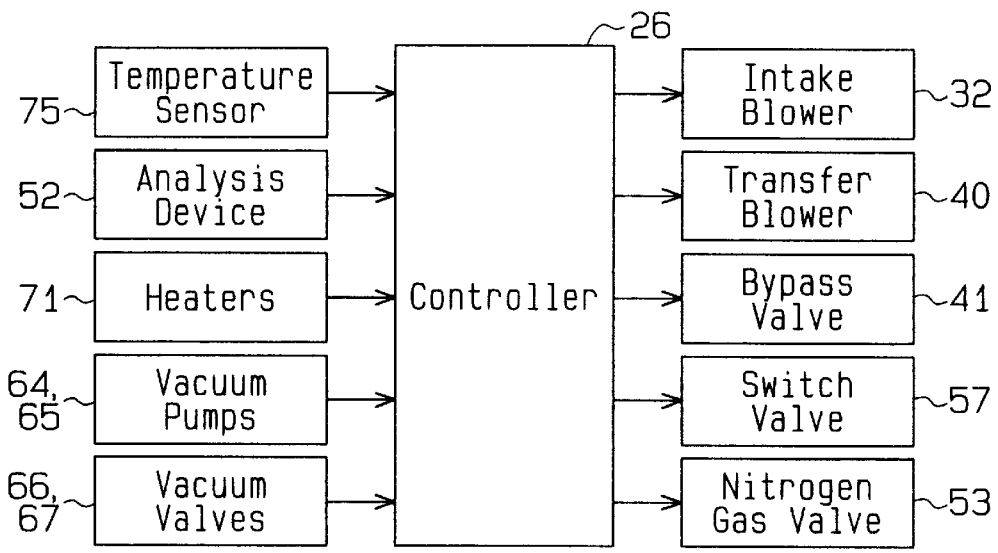
FIG. 7 is a schematic block diagram showing the electric structure of the exhaust gas treating apparatus of FIG. 2.
Figure 7:
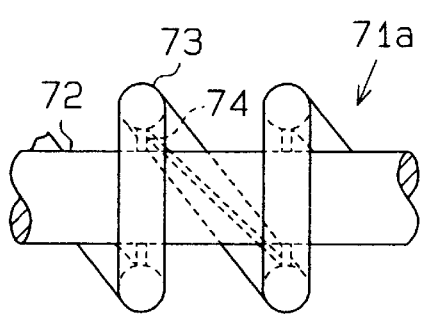
Figure 7:
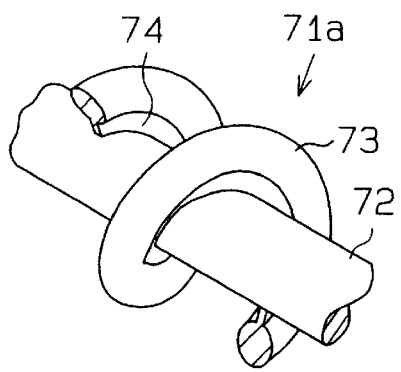
Figure 7:
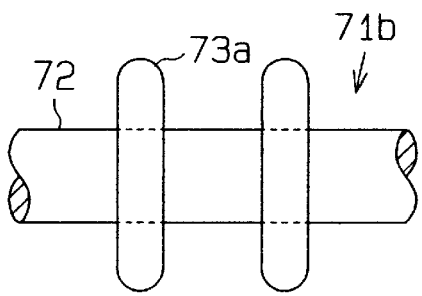
Figure 7:
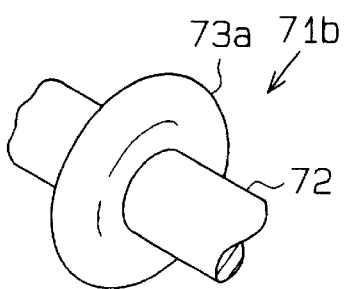

Referring to FIG. 7, the controller 26 is connected to a temperature sensor 75, the weight analysis device 52, the heaters 71, the vacuum pumps 64, 65, the vacuum valves 66, 67, the exhaust gas intake blower 32, the transfer blower 40, the bypass valve 41, the nitrogen gas valve 53, and the switch valve 57. The temperature sensor 75 detects the temperature in the desorbing tower 51 and provides a corresponding temperature signal to the controller 26. The controller 26 controls the temperature of the heaters 71 in accordance with the temperature signal.

The advantages of this embodiment will now be discussed.

(1) Solvents are collected from the organic gases desorbed at the first desorbing temperature and are recycled. This decreases the operating cost of the semiconductor fabrication apparatus. Further, the adsorbing carbon 36 is heated to the second desorbing temperature and renewed such that the capacity becomes almost the same as fresh activated carbon. This decreases the frequency of replenishment or exchange of the activated carbon and decreases the operating cost of the exhaust gas treating apparatus 21.

(2) When the adsorbing capacity of the adsorbing carbon 35 becomes extremely low, the adsorbing carbon 35 is heated to the second desorbing temperature and renewed. Thus, the treating of the exhaust gases may be performed in a substantially continuous manner.

(3) The employment of the spiral heaters 71 decreases the size of the desorbing tower 51.

(4) The extension 73 of each heater 71 increases the area of contact between the heater 71 and the activated carbon. This ensures that the activated carbon is heated to the first or second adsorbing temperature by the desorbing tower 51, which is relatively small.

(5) The case 61 of the desorbing tower 51 has a two-part structure that includes a depressurized clearance. Thus, the desorbing tower 51 has superior insulation. This permits the temperature of the desorbing tower 51 to be maintained at a predetermined value and enables automatic operation of the exhaust gas treating apparatus 21.

(6) The outer wall 62 and the inner wall 63 each have a two-part structure provided with a depressurized clearance. This further improves the heat insulating characteristic of the case 61.

(7) The heaters 71 are arranged in the desorbing tower 51 and directly heat the adsorbing carbon 36 in a substantially uniform manner. This facilitates temperature control in comparison to the indirect heating performed by the conventional fins 5. Thus, the adsorbing carbon 36 is heated accurately to the predetermined temperature.

It should be apparent to those skilled in the art that the present invention may be embodied in many other specific forms without departing from the spirit or scope of the invention. Particularly, it should be understood that the present invention may be embodied in the following forms.

Instead of directly abutting the extension 73 with the main coil 72 as shown in FIG. 5, a heater 71a may have a fin 74 that connects the extension 73 to the main coil 72 as shown in FIGS. 8A and 8B. Alternatively, in lieu of the extension 73, a heater 71b may have a plurality of equally spaced rings 73a arranged on the main coil 72 as shown in FIGS. 9A and 9B.

Instead of switching the heating temperature of the desorbing tower 51 automatically with the controller 26, the heating temperature may be switched manually by an operator. In such case, the operator performs weight analysis of the desorbed carbon 35 using the weight analysis device 52 and switches the heating temperature manually based on the analysis result. Further, the controller 26 may be provided with a display device for displaying the analysis result of the weight analysis device 52. In this case, the weight analysis is performed automatically and the operator switches the heating temperature manually.

Plural sets of the series-connected desorbing unit 24 and collecting unit 25 may be provided. In this case, the first desorbing temperature is changed in each set so that organic solvents having different boiling points may be collected separately. This enables the solvents to be easily recycled.

Exhaust gases that include organic gases having close boiling points may be treated. In this case, the collected mixture of various types of solvents may be used when allowed. If necessary, the solvent mixture may be separated into different components in accordance with, for example, their specific gravity.

The exhaust gas treating apparatus 21 may be used to treat gases other than organic gases.

An inert gas such as argon gas may be provided to the desorbing tower 51 in lieu of the nitrogen gas.

Known adsorbents such as alumina or silica may be used in lieu of the activated carbon.

The present examples and embodiments are to be considered as illustrative and not restrictive, and the invention is not to be limited to the details given herein, but may be modified within the scope and equivalence of the appended claims.

What is claimed is:

1. A method for treating exhaust gases, comprising the steps of:
adsorbing impurity gases included in the exhaust gases with an adsorbent disposed in an adsorbing tower;
transferring the adsorbent to a desorbing tower;
desorbing the impurity gases from the adsorbent disposed in the desorbing tower by heating said adsorbent disposed in said desorbing tower to a first predetermined temperature;
determining if said adsorbed impurity gases are desorbed from said adsorbent heated to said first predetermined temperature, then if said adsorbed impurity gases are not desorbed,
heating said adsorbent disposed in said desorbing tower to a second predetermined temperature, which is higher than the first predetermined temperature; and
transferring the desorbed adsorbent to the adsorbing tower.

2. A method for treating exhaust gases, comprising the steps of:
adsorbing impurity gases included in the exhaust gases with an adsorbent disposed in an adsorbing tower;
transferring the adsorbent to a desorbing tower;
desorbing the impurity gases from the adsorbent disposed in the desorbing tower by heating said adsorbent disposed in said desorbing tower to either a first predetermined temperature or a second predetermined temperature, which is higher than the first predetermined temperature; and
transferring the desorbed adsorbent to the adsorbing tower, wherein the weight of the absorbent heated to the first predetermined temperature is analyzed, and the absorbent is heated due to the second predetermined temperature if the result of the analysis determines a density greater than a predetermined value.

3. The method according to claim 2, further comprising the step of cooling the desorbing tower with a gas separate from the exhaust gas being treated to change the temperature from the second predetermined temperature to the first predetermined temperature.

4. The method according to claim 1, further comprising the step of collecting solvents from the impurity gases desorbed in the desorbing step.

5. The method according to claim 4, wherein the collecting step includes the steps of:
condensing the gases desorbed during the desorbing step;
collecting a first solvent from the impurity gases desorbed at the first predetermined temperature in a first tank; and
collecting a second solvent from the impurity gases desorbed at the second predetermined temperature in a second tank.

* * * * *

UNITED STATES PATENT AND TRADEMARK OFFICE
CERTIFICATE OF CORRECTION

PATENT NO. : 6,508,858 B2
DATED : January 21, 2003
INVENTOR(S) : Hideki Hirose et al.

It is certified that error appears in the above-identified patent and that said Letters Patent is hereby corrected as shown below:

<u>Title page,</u>
Item [75], the name of the legal representative of the first named inventor should be changed from "Fumiko HIROSE" to -- Emiko HIROSE --

Signed and Sealed this

Ninth Day of September, 2003

JAMES E. ROGAN
*Director of the United States Patent and Trademark Office*